United States Patent
Kochhar et al.

(10) Patent No.: US 7,929,424 B2
(45) Date of Patent: Apr. 19, 2011

(54) SWITCHOVER FOR BROADBAND SUBSCRIBER SESSIONS

(75) Inventors: Rajeev Kochhar, Saratoga, CA (US); Kishore K. Seshadri, Saratoga, CA (US); Peter Arberg, Hojbjerg (DK); Robert G. Kilfoyle, Campbell, CA (US); Ganesan Vivekandan, San Jose, CA (US); Che-Lin Ho, San Jose, CA (US); Arunkumar M. Desigan, Santa Clara, CA (US)

(73) Assignee: Ericsson AB, Stockholm (SE)

( * ) Notice: Subject to any disclaimer, the term of this patent is extended or adjusted under 35 U.S.C. 154(b) by 1599 days.

(21) Appl. No.: 10/977,244

(22) Filed: Oct. 29, 2004

(65) Prior Publication Data

US 2005/0120139 A1  Jun. 2, 2005

Related U.S. Application Data

(60) Provisional application No. 60/516,365, filed on Oct. 31, 2003.

(51) Int. Cl.
*G01R 31/08* (2006.01)
*G06F 11/00* (2006.01)
*H04J 1/16* (2006.01)
*H04L 12/26* (2006.01)
*H04L 12/28* (2006.01)
*H04Q 11/00* (2006.01)

(52) U.S. Cl. ........ 370/220; 370/244; 370/254; 370/360; 714/4; 714/15; 714/23

(58) Field of Classification Search .......... 370/216–228, 370/242–245, 360; 398/1–8; 714/100, 1–5, 714/15, 24–26
See application file for complete search history.

(56) References Cited

U.S. PATENT DOCUMENTS

| | | | |
|---|---|---|---|
| 4,847,749 | A | 7/1989 | Collins et al. |
| 5,301,309 | A | 4/1994 | Sugano |
| 6,195,345 | B1 | 2/2001 | Kramer |
| 6,910,148 | B1 | 6/2005 | Ho et al. |
| 6,934,249 | B1 * | 8/2005 | Bertin et al. ........... 370/218 |
| 7,003,692 | B1 | 2/2006 | Banks et al. |
| 7,080,151 | B1 * | 7/2006 | Borella et al. ......... 709/230 |
| 7,590,760 | B1 * | 9/2009 | Banks et al. ........... 709/248 |
| 2002/0107966 | A1 | 8/2002 | Baudot et al. |
| 2003/0056138 | A1 * | 3/2003 | Ren ......................... 714/4 |
| 2004/0047286 | A1 * | 3/2004 | Larsen et al. .......... 370/216 |
| 2004/0078619 | A1 * | 4/2004 | Vasavada ................. 714/4 |
| 2005/0078600 | A1 * | 4/2005 | Rusmisel et al. ...... 370/217 |

OTHER PUBLICATIONS

PCT/US04/36507, Sep. 14, 2006, International Search Report.
PCT/US04/36507, Sep. 14, 2006, Written Opinion.
PCT/US04/36507, Oct. 18, 2006, International Prelim Report.
PCT/US04/36507, Oct. 18, 2006, Written Opinion.

* cited by examiner

*Primary Examiner* — Alpus H Hsu
*Assistant Examiner* — Jeremy Costin
(74) *Attorney, Agent, or Firm* — Blakely, Sokoloff, Taylor & Zafman LLP (57) ABSTRACT

Methods and apparatuses for process a crossconnect switchover in a network element are described. According to one embodiment, an exemplary method includes synchronizing state information regarding broadband subscriber sessions of one or more circuits of a network element between one or more hub devices of an active control card and a standby control card of the network element, and in response to a crossconnect switchover, starting up one or more sessions associated with the one or more hub devices of the standby control card using the synchronized information, such that the one or more sessions are started up as if they are restarted. Other methods and apparatuses are also described.

21 Claims, 6 Drawing Sheets

SWITCHOVER FOR BROADBAND SUBSCRIBER SESSIONS

RELATED APPLICATIONS

This application claims the benefit of U.S. Provisional Application No. 60/516,365, filed Oct. 31, 2003, which is hereby incorporated by reference.

FIELD OF THE INVENTION

The present invention relates generally to communications. More particularly, this invention relates to a switchover for broadband subscriber sessions.

BACKGROUND OF THE INVENTION

In the field of communications, the need for high-speed transmission of data, including video and audio, has continued to increase. Moreover, there has been an increase in the selection of services by which users can connect to a network, such as the Internet. Specifically, Internet Service Providers (ISPs) may allow for connectivity to the Internet through lower-speed connections at different rates, such as 56 kilobits/second, by employing a plain old telephone service (POTS) line. Other choices for connection, which are at higher speeds, into a network can include integrated services digital network (ISDN), digital subscriber line (DSL) service, and cable modem service over a radio frequency (RF) cable line. Further, other types of content providers may enable a subscriber to receive different types of media, such as a video stream, audio stream, etc.

Figure 1:
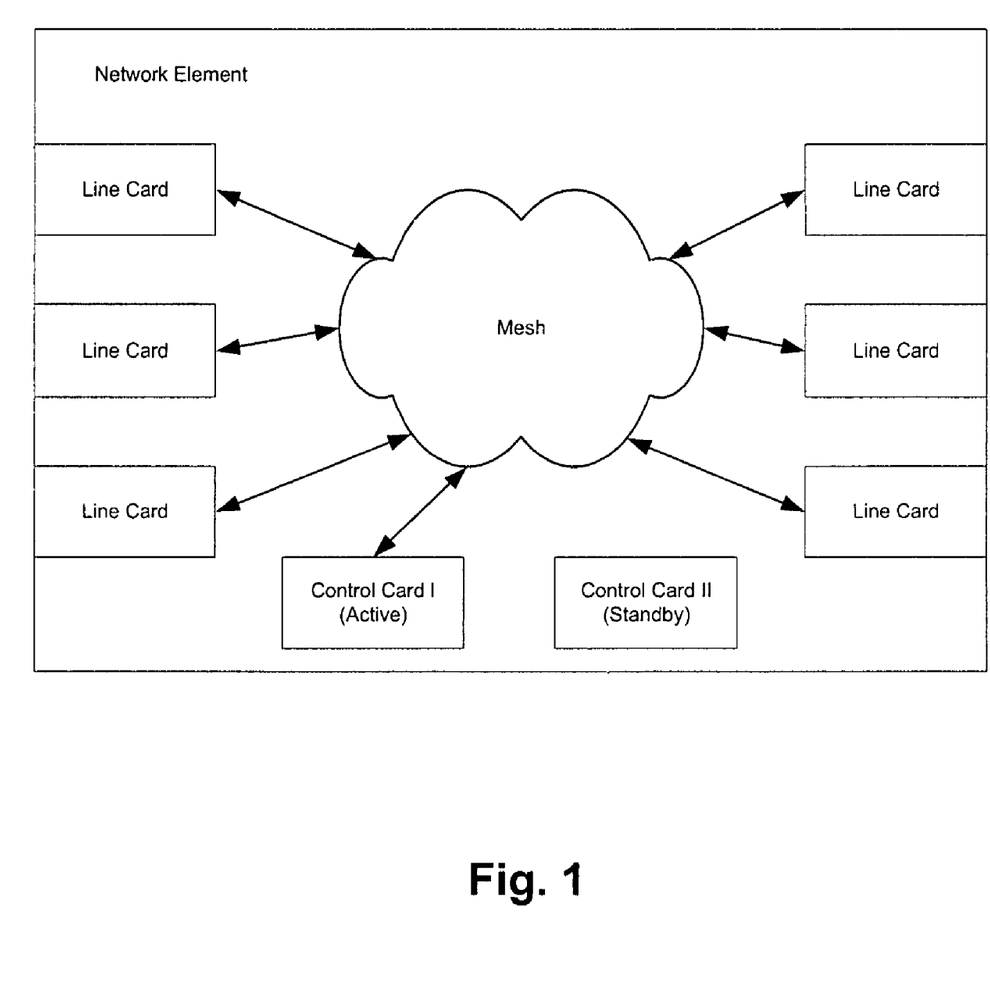
FIG. 1 is a diagram illustrating a typical network infrastructure.

A network element terminates tens of thousands broadband subscriber sessions. As technology advances, the number of sessions that terminate on a single system is increasing. Service providers want to provide service level agreements for the services they provide. Hence maintaining the functioning state of a subscriber session is of very high importance. FIG. 1 is a block diagram of a typical network element. Referring to FIG. 1, the network element includes one or more line cards and one or more control cards. One of the control cards is an active control card communicating with the lines cards. One of the control cards is a standby control card which will take over the tasks of the active control card when the active control card fails to operate. Typically, the active control card and the standby control card does not communicate with each other with respect to the dynamic operating states of the circuits provided by the line cards. When the active control card goes down and the standby control card takes over, the standby control card does not have the latest operating states of the circuits. As a result, the standby control card takes a relatively longer time to start up the processes and the subscribers of the network element may lose connections while the network element waits for the standby control card to fully operate.

SUMMARY OF THE INVENTION

Methods and apparatuses for process a crossconnect switchover in a network element are described. According to one embodiment, an exemplary method includes synchronizing state information regarding broadband subscriber sessions of one or more circuits of a network element between one or more hub devices of an active control card and a standby control card of the network element, and in response to a crossconnect switchover, starting up one or more sessions associated with the one or more hub devices of the standby control card using the synchronized information, such that the one or more sessions are started up as if they are restarted. Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Methods and apparatuses for process a crossconnect switchover in a network element are described. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent finite sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to one or more different apparatuses for performing the operations herein. This apparatus may be specially constructed for the required purposes (e.g., software, hardware, and/or firmware, etc.), or it may comprise a general purpose computer selectively activated or reconfigured by a computer program stored in the computer. The instructions of such software, firmware, and computer programs may be stored in a machine readable medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, electrical, optical, acoustical or other forms of prorogated signals (e.g., carrier waves, infrared signals, etc.) or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
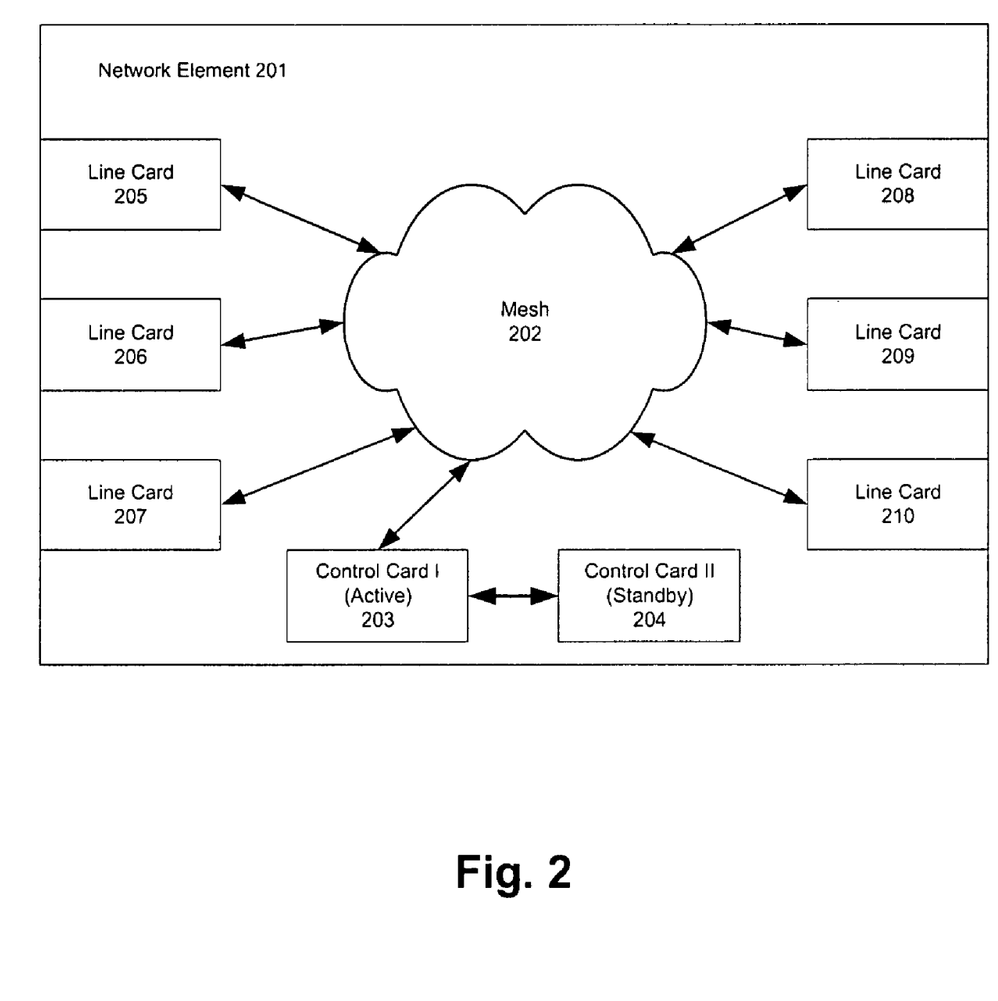
FIG. 2 is a diagram illustrating an exemplary network infrastructure according to one embodiment of the invention.

FIG. 2 is a block diagram illustrating an exemplary network element according to one embodiment of the invention. In one embodiment, the exemplary network element 201 includes, but is not limited to, an active control card having one or more hub devices, and a standby control card communicatively coupled to the active control card, the standby control card having one or more hub devices corresponding to the one or more hub devices of the active control card respectively, where the active control card synchronizes state information regarding one or more circuits of the network element between the one or more hub devices of an active control card and a standby control card, and where in response to a cross-connect (XC) switchover event, the standby control card starts up one or more processes associated with the one or more hub devices of the standby control card using the synchronized information, such that the one or more processes are started up as if they are restarted.

Referring to FIG. 2, exemplary network element 201 includes, but not limited to, an active control card 203 and a standby control card 204, and one or more line cards 205-210. In this embodiment, active control card 203 and standby control card 204 communicates with each other to dynamically synchronize the operating states via IPC (inter-process communication) protocols. The information may be synchronized or exchanged periodically or substantially constantly between the active control card and the standby control card.

In one embodiment, active control card 203 and standby control card 204 maintain steady state subscriber sessions in the face of software or hardware failures. If there is a software failure which causes a single process to restart, the steady state subscriber session is not affected. If there is software or hardware fault which causes the primary control card 203 to fail and causes the system to switchover to the standby control card, in this case also the steady state subscriber sessions is not affected. For example, in response to an event that the active control card goes down, the standby control card immediately takes over the operations of the control card using the synchronized information to start one or more processes of the key components of the standby control card. Since the standby control card already had the information, such as operating states, of the components, the processes associated with the components may be started in a relatively short period of time, as if those processes were restarted (e.g., warm restart) within the standby, now active control card.

Figure 6:
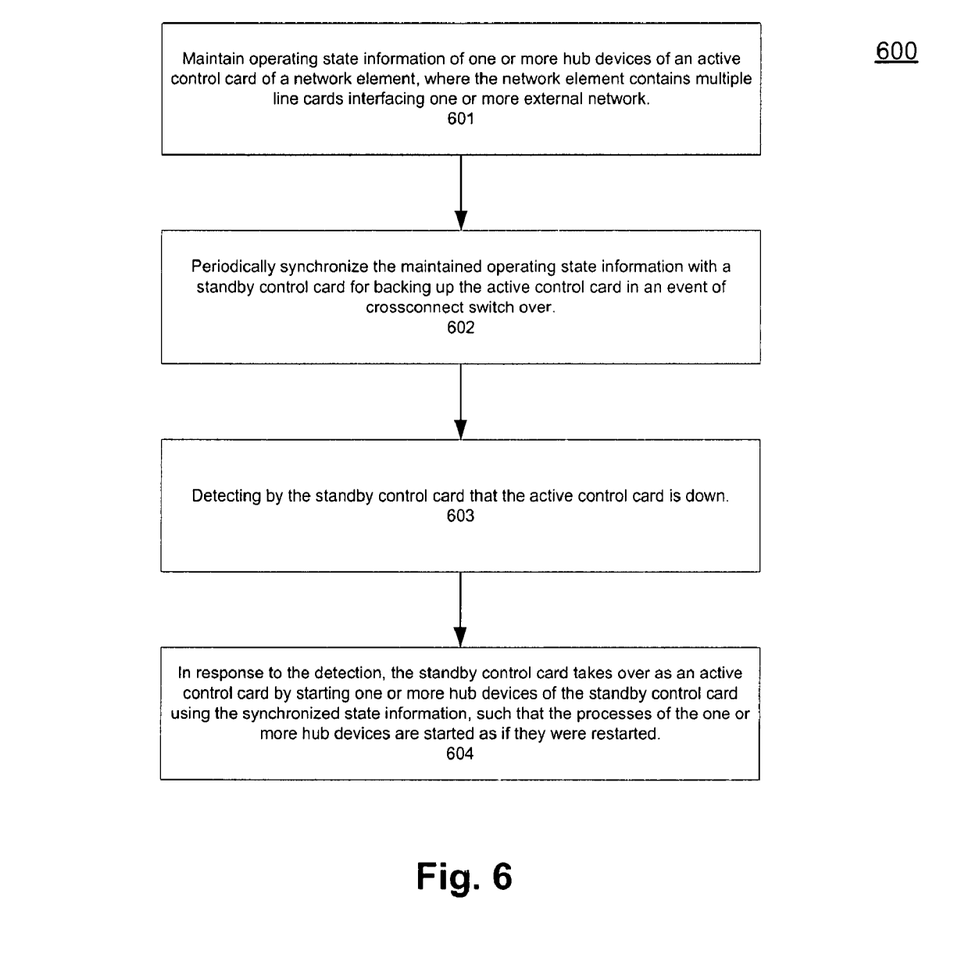
FIG. 6 is a flow diagram illustrating an exemplary process for crossconnect switchover of a network element, according to one embodiment of the invention.

FIG. 6 is a flow diagram illustrating an exemplary process for crossconnect switchover of a network element, according to one embodiment of the invention. Exemplary process 600 may be performed by a processing logic that may comprise hardware (circuitry, dedicated logic, etc.), software (such as is run on a dedicated machine), or a combination of both. In one embodiment, exemplary process 600 includes, but is not limited to, synchronizing state information regarding one or more circuits of a network element between one or more hub devices of an active control card and a standby control card of the network element, and in response to a crossconnect switchover event, starting up one or more processes associated with the one or more hub devices of the standby control card using the synchronized information, such that the one or more processes are started up as if they are restarted.

Referring to FIG. 6, at block 601, the active control card maintains operating state information of one or more key components (also referred to as hub devices), such as, for example, AAA module 302a, RCM module 303a, ISM module 304a, and RIB module 305a, etc. In one embodiment, each of the key components of the active control card stores the state information in a storage associated with the respective component. At block 602, each of the key components of the active control card periodically synchronizes the maintained operating state information with a counterpart component of a standby control card, such as, for example, AAA module 302b, RCM module 303b, ISM module 304b, and RIB module 305b, etc. The synchronized state information may be stored in a storage associated with the counterpart components of the standby control card. At block 603, the standby control card detects that the active control card is down. In response to the detection, at block 604, the standby control card takes over the operations of the active control card by starting one or more key components of the standby control card using the synchronized state information. As a result, the processes of the one or more key components are started as if they were restarted, similar to a warm restart. Other operations may also be performed.

Figure 3:
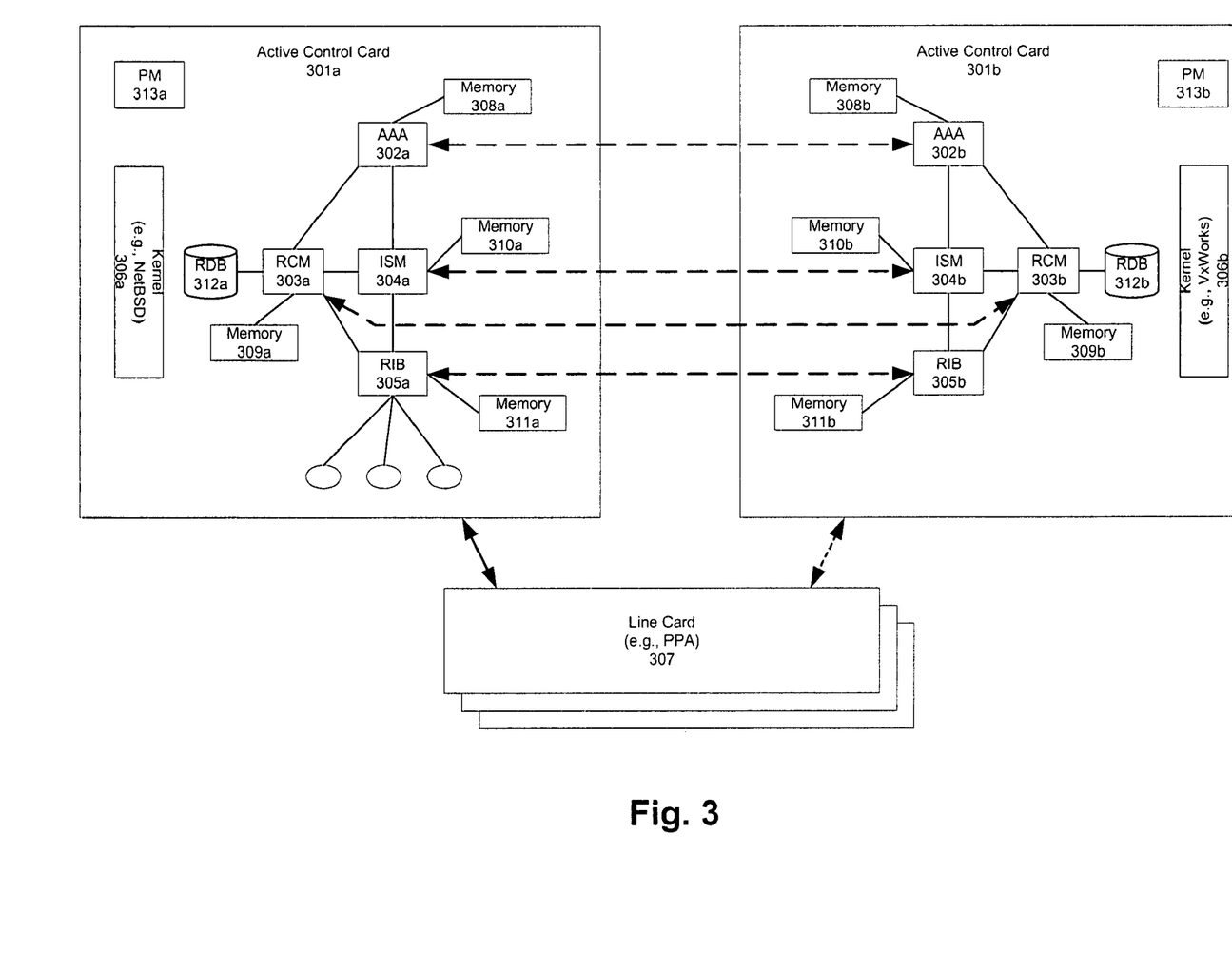
FIG. 3 is a block diagram illustrating an exemplary network element according to one embodiment of the invention.

FIG. 3 is a block diagram illustrating an exemplary active control card and standby control card according to one embodiment of the invention. Referring to FIG. 3, according to one embodiment, each of the active control card 301a and standby control card 301b includes, but is not limited to, an AAA (authorization, authentication, and accounting) module 302a or 302b, a RCM (router configuration module) 303a or 303b, a RIB (routing information base) 305a or 305b, an ISM (interface and circuit state module) 304a or 304b, and a kernel 306a or 306b.

In one embodiment, AAA 302a of active control card 301a communicates with AAA 302b of standby control card 301b to synchronize the information regarding operating states of the subsystem (e.g., interfaces or circuits). Similarly, ISM 304a, RCM 302a, and RIB 305a of active control card 301a communicate with their counterparts, such as, for example, ISM 304b, RCM 302b, and RIB 305b of standby control card 301b respectively, to synchronize the operating states of the respective subsystem.

The kernel 306a of active control card 301a and kernel 306b of standby control card 301b may be a kernel of a variety of operating systems. For example, according to one embodiment, kernel 306a of active control card 301a and kernel 306b of standby control card 301b may be a set of kernels, such as, for example, a NetBSD operating kernel and/or a VxWorks operating kernel. Each process on the system runs in its own protected memory space. Also, each process maintains state and information necessary for the proper functioning of that sub-system. In one embodiment, the RDB (e.g., RDB 312a and/or RDB 312b) includes an area of shared memory where the actual records containing the configuration of the router is stored. Various other processes can attach to the RDB to store and retrieve relevant information.

In one embodiment, RCM 303a maintains the entire configuration of the router. The RCM attaches to the RDB to store and retrieve the configuration information. This module also makes sure that the configuration of the router on the active and standby control cards 301a and 301b are synchronized. The RCM guarantees that the RDB on standby control card 301b knows about substantially all the information that is known by the standby.

In one embodiment, most of the forwarding table of the network element is managed by RIB 305a or 305b. This module communicates with one or more PPAs (packet processing ASICs) on the line cards 307 to configure their routing tables. RIB also makes use of memory to store relevant state information. The RIB 305a also synchronizes information with RIB 305b of the standby control card.

In one embodiment, the ISM module is responsible for maintaining the state and configuration, such as event port, circuit and interface, that exists on the system. ISM is also responsible for disseminating this information to interested client processes. The ISM also utilizes a memory, such as memory 310a/310b, to store relevant state information. The ISM also synchronizes information with the respective ISM of the standby control card.

In one embodiment, AAA module 302a/302b plays a central role in the process of bringing up, maintaining and accounting for subscriber sessions. All subscriber session bring-up, provisioning and accounting are controlled by this module. The AAA also utilizes a memory (e.g., memory 308a/308b) to store relevant state information. The AAA also synchronizes information with the respective AAA module of the standby control card.

In one embodiment, the PM (processing module) 313a is responsible for monitoring and maintaining the process health of the system. The PM is also responsible for communicating process stops and starts to other relevant processes.

According to one embodiment, in the event of a software failure which causes a process to crash and re-start, the process can start and re-initialize itself without causing any other instability in the system. Since the operating states of the key components of the network element are preserved prior to the switch over, the processes of the standby control card can be started in a relatively short period of time. According to one embodiment, a process of a standby control card can re-initialize itself by getting information from at least one of the following sources:
 Configuration information from RCM and RDB
 Stored state in shared memory
 Other information communicated to it by other co-operating processes. For instance all circuit, interface and port information can be obtained by communicating with ISM Thus, if the information that is necessary for the re-initialization of a process can be synchronized over from the active to the standby control card, the system can re-initialize itself after a XC (cross connect) switch and cause minimal disruption to existing subscriber sessions and traffic forwarding.

During the normal operations, the key components of the system, such as, for example, ISM, RCM, AAA, and RIB modules, communicate with their counterparts of a standby control card to ensure that the active and standby control cards keep the information synchronized. During a XC switchover, the PPAs (e.g., PPAs 307) continue forwarding traffic based on the current copy of their forwarding tables. Meanwhile the becoming active control card (e.g., formerly standby control card) goes through an orderly bring up sequence. The processes are started up by the PM. As a process is started, it re-initializes itself from information stored in one of the three places mentioned above (e.g., the RCM/RDB, shared memory, and other co-operating processes). Once the process of bringing up the processes on the BSD is completed, the relevant BSD processes synchronize their copy of the information with the PPAs.

There is a variety of methods may be used to synchronize the major components of an active control card and a standby control card. In one embodiment, a module of an active control card transmits the information to the respective counterpart of the standby control card via IPC before storing the information in its own memory. This is also referred to as an inline synchronization method. For example, referring to FIG. 3, when RCM 303a of active control card 301a receives information, RCM 303a may transmit the information to its counterpart RCM 303b of standby control card 301b and waits for an acknowledge returned from RCM 303b before storing the information in its associated memory 309a. In this way, it would be certain that RCM 303b of standby control card is synchronized before RCM 303a of active control card 301a moves on. However, there is a drawback for this method. Since each of the major components synchronizes with its counterpart in standby control card, the overhead traffic would be heavy and it may slow down the processes of the active control card. In one embodiment, RIB module 305a uses the inline method to synchronize information with its counterpart 305b.

In an alternative embodiment, a module of an active control card may initially store the information in its associated memory and a background process (e.g., a thread) may transmit the information stored in the memory to the counterpart module of the standby control card in a delay fashion (e.g., when the network traffic is not heavy). This method is also referred to as a delay synchronization method.

In a further embodiment, a module of an active control card may transmit a portion of the information (e.g., a critical or important portion of the information) to the counterpart module of the standby control card using the inline synchronization method, while the rest of the information is stored in the associated memory and is transmitted over subsequently via the delay synchronization method. This method is also referred to as a hybrid synchronization method. For example, referring to FIG. 3, when AAA module 302a of active control card 301a receives information regarding operating states of the circuits, AAA module 302a may transmit at least a portion of the information, which may be the critical or important information, to AAA module 302b of standby control card 301b using the inline method. It also informs AAA module 302b that one or more circuits have updated information and the updated information may be coming subsequently. In addition, AAA module 302a stores the rest of the information in its associated memory 308a and the stored information may be transmitted in the background to AAA module 302b or its associated memory via, for example, another IPC process which may be executed in the background in a delay fashion.

In a further embodiment, a module of an active control card may transmit the information inline over to the respective counterpart module of the standby control card. When the counterpart module of the standby control card receives the information, it stores the information in a temporary buffer and immediately returns an acknowledgement back to the active control card. The information stored in the temporary buffer may be populated into the associated memory when the standby control card becomes the active control card. For example, referring to FIG. 3, when ISM 304a of active control card 301a receives information, ISM 304a may inline transmit the information to its counterpart ISM 304b of standby control card 301b. When ISM 304b receives the information from ISM 304a, ISM 304b stores the information in a temporary buffer (not shown) and immediately returns an acknowledgement back to ISM 304a. Subsequently, when the switchover takes place and the standby control card 301b becomes an active control card, ISM 304b then creates or populates the information stored in the temporary buffer into its associated memory during the startup of the ISM 304b.

Note that any one or all of the modules in an active control card may use any one of the aforementioned methods, individually or in combination, to synchronize their respective counterpart module of a standby control card. It will be appreciated that the methods for synchronization are not limited to those described above, other methods apparent to those with ordinary skill in the art may be utilized. For example, the memory associated with each major module shown in FIG. 3 may be a global memory, which may includes one or more segments associated with each components of the control card. The information stored in the global memory (for all modules) may be transmitted or copied to a global memory of a standby control card by a separate process dedicated for such purpose and running constantly or periodically at background. Other configurations may exist.

Referring to FIG. 3, according to one embodiment, when active control card is operating, ISM 304a and RIB 305a of active control card 301 also communicate with one or more PPAs (e.g., line cards such as line cards 205-210 of FIG. 2) to synchronize information regarding one or more circuits they provide. When switchover takes place and before standby control card 301b fully functions, PPAs 307 continue processes packets based on the information they maintained within the respective PPAs. Once standby control card 301b is up and running, PPAs 307 start to communicate with ISM 304b and RIB 305b of standby control card, now active control card 301b to synchronize the new information.

In one embodiment, while standby control card 301b is in a standby mode, the key components of the standby control card, such as, AAA 302b, ISM 304b, RCM 303b, and RIB 305b, are still operating, while other processes associated with these key components are not and have to start up when switchover takes place. For example, when switchover takes place and AAA 302b is running, according to one embodiment, its associated processes, such as PPP (point-to-point protocol), PPPoE (PPP over Ethernet), or ATM (asynchronous transfer mode), etc. start up using the synchronized information obtained by AAA 302b. Similarly, the routing protocol processes associated with RIB 305b and provisioning, QoS (quality of service), multicast, or ACL (access control list) processes associated with RCM 303b start up using the synchronized information obtained by RIB 305b and RCM 303b respectively. Other configurations may exist.

As described above, information between an active control card and a standby control card is synchronized inline, in a delay fashion, or in a combination of both methods. As a result, at least a portion of the information is synchronized at different time with respect to those synchronized inline. For example, the AAA module of the active control card synchronizes a first portion of the information inline with its counterpart in a standby control card and synchronizes the rest of the information (e.g., a second portion) in a delay fashion. As a result, the first portion and the second portion are synchronized at different time. It is possible that after the first portion of the information has been synchronized and before the second portion of the information is synchronized, the active control card goes down (e.g., the XC switchover). As a result, at least a portion of the information has not been synchronized and the corresponding interfaces or circuits are not synchronized. When a standby control card takes over, the processes of the key components (e.g., ISM, AAA, RIB, RCM, etc.) of the standby control card cannot use the unsynchronized information to start up the associated processes. It is important for the key components of the standby control card to know which interface or circuit has not been synchronized. For those interfaces or circuits that have not been synchronized, the associated sessions have to start up from scratch. However, for those interfaces or circuits that have been synchronized before the XC switchover, the associated sessions can start up as they are restarting using the synchronized information.

Figure 4:
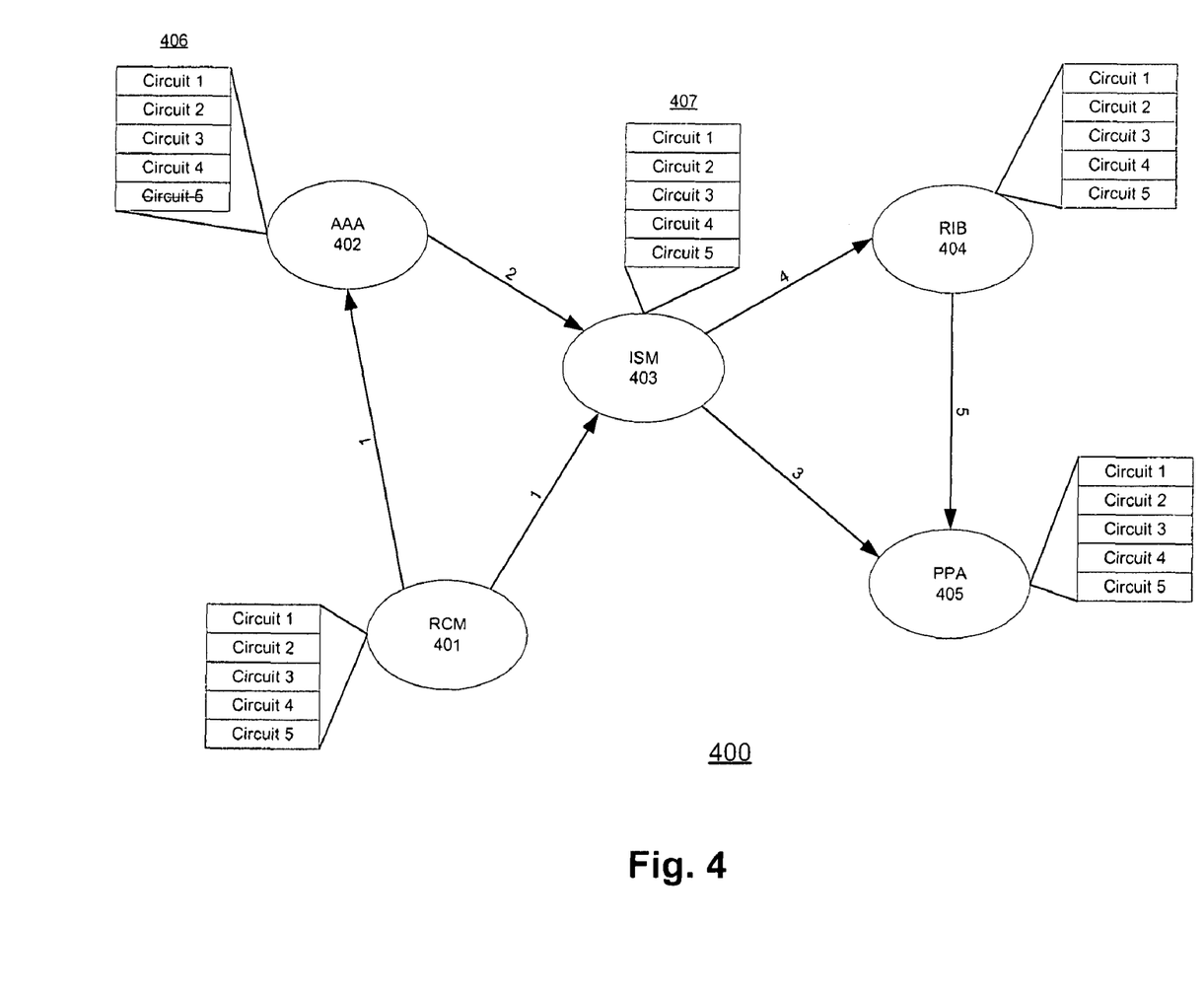
FIG. 4 is a flow diagram illustrating an exemplary information flow among modules of a network element according to one embodiment of the invention.

FIG. 4 is a flow diagram illustrating an exemplary information flow among key components of a control card to synchronize the information. Referring to FIG. 4, according to one embodiment, after the XC switchover takes place and before the processes associated with each key components, such as RCM 401, AAA, 402, ISM 403, and RIB 404, start up, the information regarding the operating states of the interfaces or circuits has to be synchronized among the key components of the previously standby, now active control card to determine which interfaces or circuits have not been fully synchronized between the active and standby control cards before the XC switchover.

According to one embodiment, the synchronization among the key components of a control card starts with RCM module 401. In one embodiment, when the XC switchover takes place, RCM module 401 transmits the information regarding operating states of one or more interfaces or circuits to AAA module 402 and ISM module 403. In one embodiment, the receiving module, such as AAA module 402 and/or ISM module 403, may store the information temporarily in a buffer until all the information has been received and receives an end of information indication, such as an EOF (end of file) indicator, at which point the receiving module may update the information with its own information. In one embodiment, the receiving module may determine whether its own information has lapsed for a predetermined amount of time since the XC switchover. If so, the receiving module may purge its own information and synchronize the information with the transmitting module, since the information has been out of synch for a while. An exemplary embodiment of a flow diagram regarding these processes is shown in FIG. 5.

Figure 5:
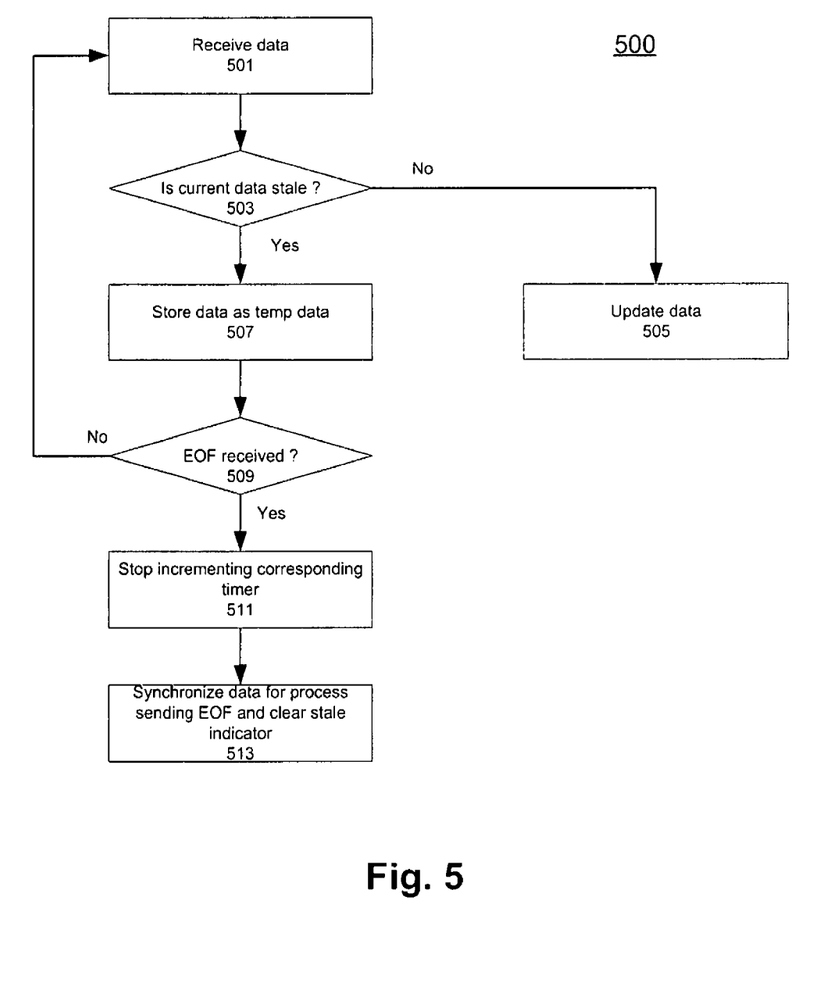
FIG. 5 is a flow diagram illustrating an exemplary process for synchronizing information among modules of a network element according to one embodiment of the invention.

Referring to FIGS. 4 and 5, for example, when AAA module 402 tries to synchronize information 406 to ISM module 403 with respect to circuits 1-5. In this case, AAA module 402 has information 406 that circuits 1-4 have been synchronized while circuit 5 has not been synchronized due to the delay while the XC switchover takes place. In one embodiment, AAA module 402 transmits information 406 sequentially to ISM module 403. ISM module 403 may store the information in a temporary buffer and wait for an indicator, such as an EOF (end of file) indicator or certain amount of time lapsed, that the all information has been transmitted over. Once AAA module 402 has transmitted information 406 to ISM 403, AAA module 402 transmits an EOF indicator to ISM module 403.

After ISM module 403 receives the EOF indicator, ISM module 403 determines whether its own data or information 407 is stale based on a predetermined amount of time maintained by a timer (block 503). If not, ISM module 403 may update information 407 with received information 406 from AAA module 402, for example, to indicate that circuit 5 is out of synch (block 505). As a result, ISM module 403 knows that circuit 5 has not been synchronized and ISM module 403 may remove information regarding circuit 5 from information 407. The processes associated with ISM module 403 may have to start all over for circuit 5, while the rest of the circuits 1-4 may be started up as if they were restarted using the synchronized information.

If ISM module 403 determines that information 407 is stale, ISM module 403 may store the received information from AAA module 402 in a temporary buffer (block 507) and waits for an EOF or amount of time lapsed to indicate the end of the information (block 509). If all the information has been received, at block 511, ISM module 403 synchronizes (e.g., overriding) information 407 with information 406 received from AAA module 402 and clears the stale indicator (block 513). Subsequently, ISM module 403 may synchronize the information with other modules, such as RIB module 404 and one or more PPA (packet processing ASIC) modules 405 (e.g., line cards) using one of the aforementioned techniques. As a result, the processes associated with each key component (e.g., AAA, ISM, RCM, or RIB module) of a standby control card may start up as if they were restarting using the synchronized information and the time to bring up the standby control card has been greatly reduced.

Thus, methods and apparatuses for process a crossconnect switchover in a network element have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a network element for handling crossconnect switchover, the network element including an active control card and a standby control card, each of the active and standby control cards having a plurality of hub devices, including an authorization, authentication, and accounting (AAA) module, a router configuration module (RCM), a routing information base (RIB) module, and an interface and circuit module (ISM), the method comprising:

synchronizing state information regarding broadband subscriber sessions of one or more circuits of the network element between one or more hub devices of the active control card and the standby control card of the network element, including a first AAA module of the active control card periodically transmitting provisioning and accounting information of one or more subscriber sessions to a second AAA module of the standby control card via a first inter-process communications (IPC) process, wherein the first and second AAA modules are configured to bring up, maintain, and account each subscriber session of the active and standby control cards, respectively, a first RCM module of the active control card periodically transmitting routing configuration information of one or more routers of the network element to a second RCM module of the standby control card via a second IPC process, wherein the first and second RCM modules are configured to configure one or more routers of the active and standby control cards, respectively, a first ISM module of the active control card periodically transmitting state information concerning event port, circuit, and interface present in the network element to a second ISM module of the standby control card via a third IPC process, wherein the first and second ISM modules are configured to maintain state and configuration information of event ports, circuits, and interfaces of the active and standby control cards, respectively, and a first RIB module of the active control card periodically transmitting state information of a forwarding table to a second RIB module of a standby control card via a fourth IPC process, wherein the first and second RIB modules are configured to configure and maintain one or more forwarding tables of the active and standby control cards, respectively, wherein the first IPC process, the second IPC process, the third IPC process, and the fourth IPC process are performed independently;

establishing a process executable in background, wherein at least a portion of the state information stored with each hub device of the active control card is transmitted to the standby control card in background via the process in a delay manner when the respective hub device is not busy; and in response to a crossconnect switchover event, starting up one or more processes associated with the one or more hub devices of the standby control card, including the second AAA module, the second RCM module, the second ISM module, and the second RIB module, using the synchronized information, such that the one or more processes are started up as if they are restarted.

2. The method of claim 1, further comprising in response to the state information received from a hub device of the active control card, a counterpart hub device of the standby control card storing the received state information in an associated storage.

3. The method of claim 2, further comprising storing the state information by each of the one or more hub devices of the active control card in a respective storage associated with each hub device.

4. The method of claim 3, further comprising receiving by the active control card an acknowledgement signal from the standby control card indicating that the transmitted state information has been received and stored successfully by the standby control card.

5. The method of claim 4, wherein storing the state information by a hub device of the active control card is performed after the acknowledgement signal is received by the active control card from the standby control card.

6. The method of claim 1, wherein a critical portion of the state information is transmitted from the active control card to the standby control card substantially immediately, while a remainder of the state information is transmitted via the process executed in the background in a delay manner.

7. The method of claim 1, wherein the network element further comprises one or more line cards interfacing with one or more external networks, and wherein one or more hub devices of the active control card synchronizes the state information with the one or more line cards prior to the crossconnect switchover, and wherein one or more hub devices of the standby control card synchronizes the state information with the one or more lines card after the crossconnect switchover.

8. A non-transitory machine-readable storage medium having executable code to cause a machine to perform a method by a network element for handling crossconnect switchover, the network element including an active control card and a standby control card, each of the active and standby control cards having a plurality of hub devices, including an authorization, authentication, and accounting (AAA) module, a router configuration module (RCM), a routing information base (RIB) module, and an interface and circuit module (ISM), the method comprising:

synchronizing state information regarding broadband subscriber sessions of one or more circuits of the network element between one or more hub devices of the active control card and the standby control card of the network element, including         a first AAA module of the active control card periodically transmitting provisioning and accounting information of one or more subscriber sessions to a second AAA module of the standby control card via a first inter-process communications (IPC) process, wherein the first and second AAA modules are configured to bring up, maintain, and account each subscriber session of the active and standby control cards, respectively,         a first RCM module of the active control card periodically transmitting routing configuration information of one or more routers of the network element to a second RCM module of the standby control card via a second IPC process, wherein the first and second RCM modules are configured to configure one or more routers of the active and standby control cards, respectively,         a first ISM module of the active control card periodically transmitting state information concerning event port, circuit, and interface present in the network element to a second ISM module of the standby control card via a third IPC process, wherein the first and second ISM modules are configured to maintain state and configuration information of event ports, circuits, and interfaces of the active and standby control cards, respectively, and         a first RIB module of the active control card periodically transmitting state information of a forwarding table to a second RIB module of a standby control card via a fourth IPC process, wherein the first and second RIB modules are configured to configure and maintain one or more forwarding tables of the active and standby control cards, respectively, wherein the first IPC process, the second IPC process, the third IPC process, and the fourth IPC process are performed independently;

establishing a process executable in background, wherein at least a portion of the state information associated with each hub device of the active control card is transmitted to the standby control card in background via the process in a delay manner when the respective hub device is not busy; and     in response to a crossconnect switchover event, starting up one or more processes associated with the one or more hub devices of the standby control card, including the second AAA module, the second RCM module, the second ISM module, and the second RIB module, using the synchronized information, such that the one or more processes are started up as if they are restarted.

9. The non-transitory machine-readable storage medium of claim 8, wherein the method further comprises in response to the state information received from a hub device of the active control card, a counterpart hub device of the standby control card storing the received state information in an associated storage.

10. The non-transitory machine-readable storage medium of claim 9, wherein the method further comprises storing the state information by each of the one or more hub devices of the active control card in a respective storage associated with each hub device.

11. The non-transitory machine-readable storage medium of claim 10, wherein the method further comprises receiving by the active control card an acknowledgement signal from the standby control card indicating that the transmitted state information has been received and stored successfully by the standby control card.

12. The non-transitory machine-readable storage medium of claim 11, wherein storing the state information by a hub device of the active control card is performed after the acknowledgement signal is received by the active control card from the standby control card.

13. The non-transitory machine-readable storage medium of claim 8, wherein a critical portion of the state information is transmitted from the active control card to the standby control card substantially immediately, while a remainder of the state information is transmitted via the process executed in the background in a delay manner.

14. The non-transitory machine-readable storage medium of claim 8, wherein the network element further comprises one or more line cards interfacing with one or more external networks, and wherein one or more hub devices of the active control card synchronizes the state information with the one or more line cards prior to the crossconnect switchover, and wherein one or more hub devices of the standby control card synchronizes the state information with the one or more line card after the crossconnect switchover.

15. A network element, comprising:

an active control card having one or more hub devices, including a first authorization, authentication, and accounting (AAA) module, a first router configuration module (RCM), a first routing information base (RIB) module, and a first interface and circuit module (ISM); and     a standby control card communicatively coupled to the active control card, the standby control card having one or more hub devices corresponding to the one or more hub devices of the active control card respectively, including a second AAA module, a second RCM module, a second RIB module, and a second ISM module,     wherein the active control card synchronizes state information regarding broadband subscriber sessions of one or more circuits of the network element between the one or more hub devices of an active control card and a standby control card, including         a first AAA module of the active control card periodically transmitting provisioning and accounting information of one or more subscriber sessions to a second AAA module of the standby control card via a first inter-process communications (IPC) process, wherein the first and second AAA modules are configured to bring up, maintain, and account each subscriber session of the active and standby control cards, respectively,         a first RCM module of the active control card periodically transmitting routing configuration information of one or more routers of the network element to a second RCM module of the standby control card via a second IPC process, wherein the first and second RCM modules are configured to configure one or more routers of the active and standby control cards, respectively, a first ISM module of the active control card periodically transmitting state information concerning event port, circuit, and interface present in the network element to a second ISM module of the standby control card via a third IPC process, wherein the first and second ISM modules are configured to maintain state and configuration information of event ports, circuits, and interfaces of the active and standby control cards, respectively, and a first RIB module of the active control card periodically transmitting state information of a forwarding table to a second RIB module of a standby control card via a fourth IPC process, wherein the first and second RIB modules are configured to configure and maintain one or more forwarding tables of the active and standby control cards, respectively, wherein the first IPC process, the second IPC process, the third IPC process, and the fourth IPC process are performed independently;

wherein the active control card establishes a process executable in background, wherein at least a portion of the state information associated with each hub device of the active control card is transmitted to the standby control card in background via the process in a delay manner when the respective hub device is not busy; and wherein in response to a crossconnect switchover event, the standby control card starts up one or more processes associated with the one or more hub devices of the standby control card, including the second AAA module, the second RCM module, the second ISM module, and the second RIB module, using the synchronized information, such that the one or more processes are started up as if they are restarted.

16. The network element of claim 15, wherein in response to the state information received from a hub device of the active control card, a counterpart hub device of the standby control card stores the received state information in an associated storage.

17. The network element of claim 16, wherein each of the one or more hub devices of the active control card stores the state information by in a respective storage associated with each hub device.

18. The network element of claim 17, wherein the active control card receives an acknowledgement signal from the standby control card indicating that the transmitted state information has been received and stored successfully by the standby control card.

19. The network element of claim 18, wherein a hub device of the active control card performs the storing after the acknowledgement signal is received by the active control card from the standby control card.

20. The network element of claim 15, wherein a critical portion of the state information is transmitted from the active control card to the standby control card substantially immediately, while a remainder of the state information is transmitted via the process executed in the background in a delay manner.

21. The network element of claim 15, further comprising one or more line cards interfacing with one or more external networks, wherein one or more hub devices of the active control card synchronizes the state information with the one or more line cards prior to the crossconnect switchover, and wherein one or more hub devices of the standby control card synchronizes the state information with the one or more line cards after the crossconnect switchover.

* * * * *

UNITED STATES PATENT AND TRADEMARK OFFICE
CERTIFICATE OF CORRECTION

| | | |
|---|---|---|
| PATENT NO. | : 7,929,424 B2 | Page 1 of 1 |
| APPLICATION NO. | : 10/977244 | |
| DATED | : April 19, 2011 | |
| INVENTOR(S) | : Kochhar et al. | |

It is certified that error appears in the above-identified patent and that said Letters Patent is hereby corrected as shown below:

On the Face Page, in Field (75), under "Inventors", in Column 1, Line 5, delete "Vivekandan," and insert -- Vivekanandan, --, therefor.

Signed and Sealed this
Third Day of January, 2012

David J. Kappos
*Director of the United States Patent and Trademark Office*